United States Patent
Yin

(10) Patent No.: US 9,294,253 B2
(45) Date of Patent: Mar. 22, 2016

(54) WIRELESS ADAPTIVE PACKET CONTROL MESSAGE APPARATUS, SYSTEMS, AND METHODS

(71) Applicant: Hujun Yin, Saratoga, CA (US)

(72) Inventor: Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/911,790

(22) Filed: Jun. 6, 2013

(65) Prior Publication Data

US 2013/0336141 A1  Dec. 19, 2013

Related U.S. Application Data

(63) Continuation of application No. 11/459,100, filed on Jul. 21, 2006, now Pat. No. 8,472,448.

(51) Int. Cl.
| | |
|---|---|
| *H04L 12/28* | (2006.01) |
| *H04L 5/00* | (2006.01) |
| *H04L 1/00* | (2006.01) |
| *H04L 1/16* | (2006.01) |
| *H04L 1/18* | (2006.01) |

(52) U.S. Cl.
CPC .............. *H04L 5/006* (2013.01); *H04L 1/001* (2013.01); *H04L 1/0026* (2013.01); *H04L 1/1678* (2013.01); *H04L 1/188* (2013.01); *H04L 1/1812* (2013.01); *H04L 1/1848* (2013.01)

(58) Field of Classification Search
CPC ... H04L 1/0026; H04L 1/1812; H04L 1/0003; H04L 1/0009; H04L 5/0007; H04L 1/1819; H04L 5/006; H04L 1/188; H04L 1/1848; H04L 1/001; H04L 1/1678
USPC .......... 370/465, 333; 375/295, 316, 259, 219, 375/222

See application file for complete search history.

(56) References Cited

U.S. PATENT DOCUMENTS

| | | | |
|---|---|---|---|
| 5,490,168 A | 2/1996 | Phillips et al. | |
| 6,385,210 B1 | 5/2002 | Overberg | |
| 7,535,869 B2 * | 5/2009 | Yoon et al. ..................... | 370/329 |
| 7,590,181 B2 * | 9/2009 | Awad et al. .................... | 375/259 |
| 7,594,160 B2 | 9/2009 | Cho | |
| 7,646,701 B2 | 1/2010 | Spencer | |
| 7,649,960 B2 * | 1/2010 | Raghavan et al. ............. | 375/295 |
| 7,912,490 B2 * | 3/2011 | Pietraski ........................ | 455/522 |
| 8,472,448 B2 | 6/2013 | Yin | |
| 2001/0034872 A1 | 10/2001 | Smallcomb | |
| 2002/0119757 A1 | 8/2002 | Hamabe | |
| 2002/0196871 A1 | 12/2002 | Nishio et al. | |
| 2003/0012308 A1 | 1/2003 | Sampath et al. | |
| 2003/0088822 A1 | 5/2003 | Kim et al. | |
| 2003/0118031 A1 | 6/2003 | Classon et al. | |

(Continued)

OTHER PUBLICATIONS

"Agilent Incremental Redundancy in EGPRSE", Application Note—5989-1156EN, http://cp.literature.agilent.com/litweb/pdf/5989-1156EN.pdf, (2004), 16 pgs.

(Continued)

*Primary Examiner* — Ajit Patel
(74) *Attorney, Agent, or Firm* — Schwegman Lundberg & Woessner, P.A.

(57) ABSTRACT

Embodiments of wireless adaptive control message apparatus, systems, and methods are described generally herein. Other embodiments may be described and claimed.

22 Claims, 4 Drawing Sheets

(56) References Cited

U.S. PATENT DOCUMENTS

| | | | |
|---|---|---|---|
| 2004/0199846 A1 | 10/2004 | Matsumoto et al. | |
| 2004/0219883 A1 | 11/2004 | Pauli et al. | |
| 2005/0053038 A1* | 3/2005 | Kimura | 370/333 |
| 2005/0068908 A1 | 3/2005 | Qian et al. | |
| 2005/0172032 A1 | 8/2005 | Pessi | |
| 2005/0197065 A1 | 9/2005 | Tamaki et al. | |
| 2006/0034220 A1 | 2/2006 | Shinshou | |
| 2006/0109822 A1* | 5/2006 | Takano | 370/335 |
| 2006/0211391 A1 | 9/2006 | Nishikawa et al. | |
| 2007/0274409 A1 | 11/2007 | Park | |
| 2008/0002565 A1 | 1/2008 | Spencer | |
| 2008/0019301 A1 | 1/2008 | Yin | |
| 2009/0232084 A1* | 9/2009 | Li et al. | 370/330 |

OTHER PUBLICATIONS

"U.S. Appl. No. 11,425,373, Response filed Jun. 24, 2009 to Non Final Office Action mailed Jan. 26, 2009", 11 pgs.

"U.S. Appl. No. 11/425,373, Non-Final Office Action mailed Jan. 26, 2009", 15 pgs.

"U.S. Appl. No. 11/425,373, Notice of Allowance mailed Aug. 24, 2009", 4 Pgs.

"U.S. Appl. No. 11/459,100 , Response filed Jan. 25, 2013 to Non Final Office Action mailed Oct. 25, 2012", 14 pgs.

"U.S. Appl. No. 11/459,100, Examiner Interview Summary Request May 18, 2010", 3 pgs.

"U.S. Appl. No. 11/459,100, Final Office Action mailed Feb. 26, 2010", 22 pgs.

"U.S. Appl. No. 11/459,100, Non Final Office Action Mailed Sep. 25, 2009", 16 pgs.

"U.S. Appl. No. 11/459,100, Non Final Office Action mailed Oct. 25, 2012", 4 pgs.

"U.S. Appl. No. 11/459,100, Notice of Allowance mailed Feb. 19, 2013", 5 pgs.

"U.S. Appl. No. 11/459,100, Response filed Dec. 28, 2009 to Non Final Office Action mailed Sep. 25, 2009", 14 pgs.

"U.S. Appl. No. 11/459,100, Response filed May 26, 2010 to Final Office Action mailed Feb. 26, 2010", 17 pgs.

"U.S. Appl. No. 11/459,100, Supplemental Notice of Allowability mailed Mar. 27, 2013", 5 pgs.

"GERAN Evolution—New Performance Data for Turbo Coding and Higher Order Modulation Schemes", 3GPP TSG GERAN #29, Tdoc GP-060931, San Jose del Cabo, Mexico, Apr. 24-28, 2006; Source: Intel Corporation, (2006), 18 pgs.

"GERAN Evolution—New Proposed Text on New Coding Schemes for Technical Report", 3GPP TSG GERAN #27, Tdoc GP-052722, Atlanta, GA, Nov. 7-11, 2005, Source: Intel Corporation, (2005), 33 pgs.

"More Results on 16QAM and Turbo Codes", 3GPP TSG GERAN #29, Tdoc GP-060784, San Jose del Cabo, Mexico, Source: Ericsson, (2006), 9 pgs.

"Multiplexing and Channel Coding (FDD) (Release 7)", 3GPP TS 25.212 v7.0.0 (Mar. 2006), (Technical Specification), (2006), 84 pgs.

"Overall Description of the GPRS Radio Interface, Stage 2 (Release 7)", 3GPP TS 43.064 V7.1.0 (Jun. 2006), (Technical Specification), (2006), 68 pgs.

"Performance of 16-QAM and Turbo Codes With Mobile Station Receive Diversity", 3GPP TSG GERAN #29, GP-060773, San Jose del Cabo, Mexico, Apr. 24-28, 2006, Source: Nokia, (2006), 5 pgs.

"Two Burst Based Link Quality Control Proposal for EGPRS", ETSI SMG2 WPA/WPB Meeting, (TDoc SMG2 WPA 127/99, WPB 003/99, Source: AT&T, Ericsson, Lucent, Lucent, Nokia, Nortel, (1999), 9 pgs.

Berrou, C., et al., "Near Shannon Limit Error-Correcting Coding and Decoding: Turbo-Codes. 1", Technical Program, Conference Record, IEEE International Conference on Communications (ICC '93), vol. 2, (May 1993), 1064-1070.

Eliaspur, Y., et al., "Normal MAP Extension for MIMO H-ARQ", IEEE 802.16 Broadband Wireless Access Working Group, (Jan. 12, 2005), 1-8.

Yin, H., "Wireless Adaptive Packet Control Message Apparatus, Systems, and Methods", U.S. Appl. No. 11/459,100, filed Jul. 21, 2006.

\* cited by examiner

WIRELESS ADAPTIVE PACKET CONTROL MESSAGE APPARATUS, SYSTEMS, AND METHODS

PRIORITY APPLICATION

This application is a continuation of U.S. application Ser. No. 11/459,100, filed Jul. 21, 2006, now issued as U.S. Pat. No. 8,472,448, which is incorporated herein by reference in its entirety.

TECHNICAL FIELD

Various embodiments described herein relate to apparatus, systems, and methods associated with wireless communications, including coding rates.

BACKGROUND INFORMATION

In some wireless packet-switched networks, frame allocation information and other control parameters may be broadcast in packet control messages. The packet control messages may be further subdivided into one or more sub-messages. In a wireless network operating according to an Institute of Electrical and Electronic Engineers (IEEE) 802.16e standard, the packet control messages and sub-messages may be denominated as "map" messages. Additional information regarding the IEEE 802.16e™ protocol standard may be found in 802.16e™: IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands (published Feb. 28, 2006).

A base station (BS) may transmit uplink (UL) and downlink (DL) map messages. The UL and DL map messages may control transmit and receive activities, respectively, of a mobile station (MS), perhaps on a per-frame basis. Map messages are thus critical to MS operation and must be reliably received by the MS. Map messages may be transmitted with low-rate coding to improve map reliability. However, low-rate coding may result in a large bandwidth overhead.

DETAILED DESCRIPTION

Figure 1:
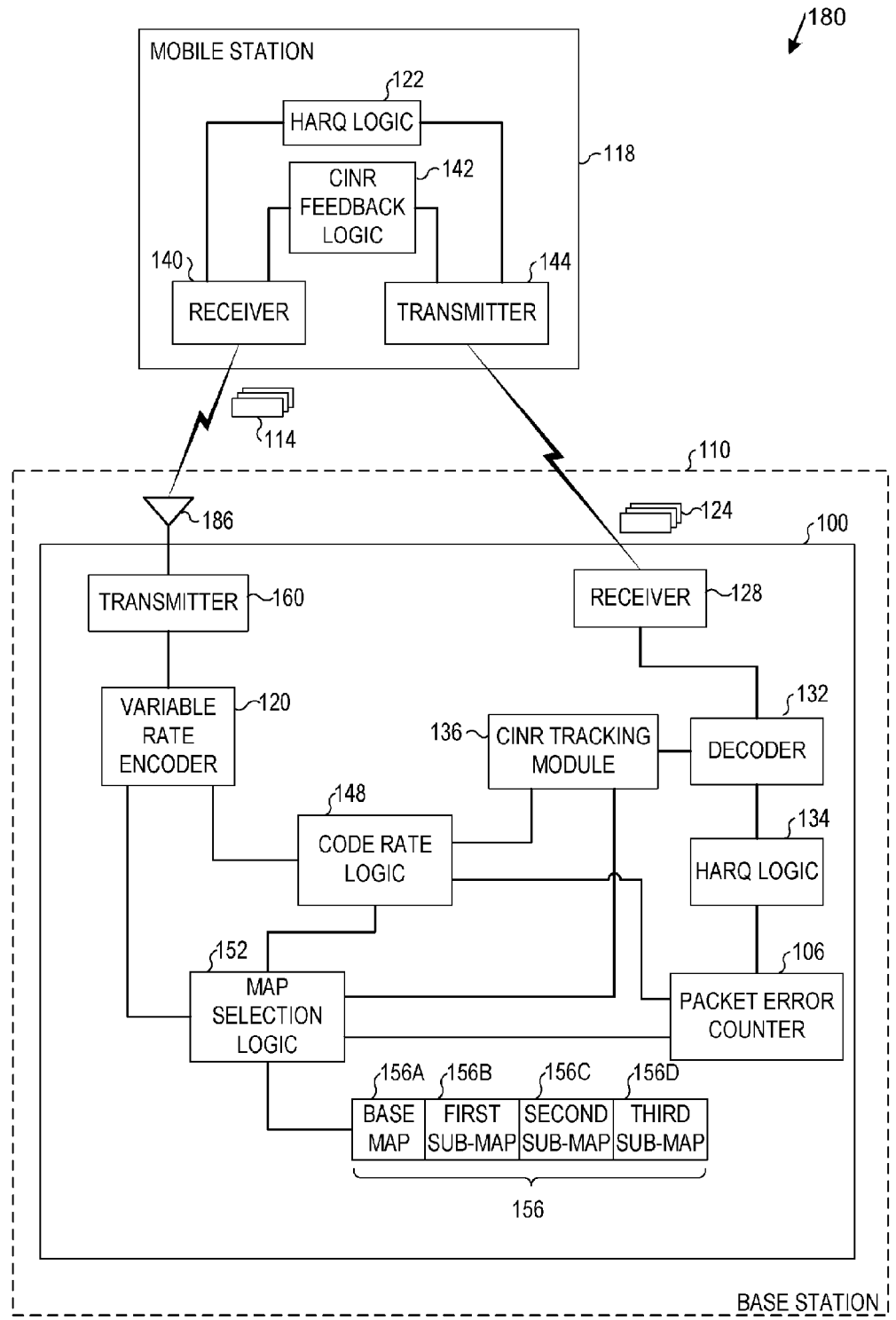
FIG. 1 is a block diagram of an apparatus and a representative system according to various embodiments.

FIG. 1 comprises a block diagram of an apparatus 100 and a system 180. Embodiments herein may decrease overhead associated with a reliable delivery of a parametric control message in a wireless communication system. In some embodiments, the wireless communication system may operate according to an IEEE 802.16e standard. In that case, the parametric control message may comprise a base compressed map, a sub-map of a compressed map, or both. Certain principles and concepts may be described hereinafter in an example IEEE 802.16e network context, using embodiments and activities described relative to a BS and an MS. The BS may represent a controlling entity in the IEEE 802.16e network. The MS may represent a mobile or fixed subscriber station.

The disclosed principles and concepts are applicable to other wireless communication systems, including an IEEE 802.11 network implemented with access points and fixed or mobile stations. Embodiments herein may also be applicable to wireless mesh networks, including networks without a hierarchal relationship between stations. Thus, the terms "BS" and "MS," as used in example embodiments herein, are intended to represent the more general case of a "first wireless station" and a "second wireless station."

Some embodiments may reduce overhead by allocating map information to one or more sub-maps. The sub-maps may be transmitted at various code rates. An MS that is capable of reliably communicating at a particular code rate may be assigned to a sub-map encoded at the particular code rate.

The apparatus 100 may include a packet error counter 106 at a BS 110. The packet error counter 106 may count packet errors associated with a packet stream 114 received at an MS 118 in the wireless communication system. The apparatus 100 may also include a variable-rate encoder 120 operatively coupled to the packet error counter 106. The variable-rate encoder 120 may encode a parametric control message (e.g., an IEEE 802.16e map or sub-map) associated with a packet from the packet stream 114.

The parametric control message may be encoded using a selected code rate. The code rate may be selected based upon a count of the packet errors maintained by the packet error counter 106. The code rate may be decreased to decrease packet errors. Alternatively, the code rate may be increased to increase a data rate associated with a transmission of the parametric control message. The code rate may be increased if the packet error count is below a selected threshold. For example, the code rate may be increased, if not already at a maximum, if no errors are detected in a sequence of ten packets received at the MS 118. Other thresholds are possible.

The packet error count may be maintained in the following way. The BS 110 may inter-operate with the MS 118 in an automatic repeat request (ARQ) mode or in a hybrid ARQ (HARQ) mode. Example embodiments described herein in the context of operation in the HARQ mode are to be understood to apply equally to operation in the ARQ mode. A packet sent from the BS 110 may be received and successfully decoded at the MS 118. HARQ logic 122 at the MS 118 may send an acknowledgment (ACK) of the successful reception to the BS 110.

Alternatively, the packet may be received with one or more errors that prevent a successful decode. In that case, the HARQ logic 122 may send a negative acknowledgement (NACK) to the BS 110. In some embodiments, the ACK or NACK may be sent on a HARQ feedback channel associated with a packet stream 124 received at the BS 110 from the MS 118.

The packet stream 124 may be received by the BS 110 at a receiver 128 and forwarded to a decoder 132. The decoder 132 may be coupled to the receiver 128 to decode contents of the HARQ feedback channel and to provide the contents to HARQ logic 134. The HARQ logic 134 may be coupled to the decoder 132 and to the packet error counter 106. The HARQ logic 134 may increment the packet error counter 106 after a NACK is received at the BS 110 from the MS 118. The HARQ logic 134 may thus track ACKs or NACKs received at the BS 110 from the MS 118. The ACKs or NACKs may correspond to packets sent from the BS 110 to the MS 118, as previously described.

The apparatus 100 may also include a carrier to interference plus noise ratio (CINR) tracking module 136 coupled to the decoder 132. The CINR tracking module 136 may receive a CINR indication from the MS 118 on a CINR feedback channel. The CINR indication may be associated with the packet stream 114 as received at the MS 118, and may comprise a numerical value or a relative indication of a range of CINR values. The CINR value associated with the packet stream 114 may be measured at a receiver 140 at the MS 118. CINR feedback logic 142 at the MS 118 may encode the value of the CINR associated with the packet stream 114. A transmitter 144 may transmit the encoded CINR value to the BS 110.

The apparatus 100 may further include code rate logic 148 coupled to the packet error counter 106 and to the CINR tracking module 136. The code rate logic 148 may determine the selected code rate based upon the packet error count, the CINR indication, or both. Map selection logic 152 may be coupled to the packet error counter 106 and/or to the CINR tracking module 136. The map selection logic 152 may assign the MS 118 to a map selected from an available group of maps 156. The map may be selected such that it is transmitted to the MS 118 at the selected code rate. In one example, the selected map may comprise a base map 156A, a first sub-map 156B, a second sub-map 156C, and/or a third sub-map 156D. Although FIG. 1 depicts three sub-maps, the selected map may be selected from additional or fewer sub-maps. The apparatus 100 may also include a transmitter 160 coupled to the variable-rate encoder 120. The transmitter 160 may transmit the packet stream 114 to the MS 118 at the selected code rate.

In a further embodiment, a system 180 may include one or more of the apparatus 100. An antenna 186 may be operatively coupled to the variable-rate encoder 120 to transmit the packet stream 114. The antenna 186 may comprise a patch antenna, an omnidirectional antenna, a beam antenna, a monopole antenna, a dipole antenna, or slot antenna, among other types.

Any of the components previously described may be implemented in a number of ways, including embodiments in software. Thus, the apparatus 100; the packet error counter 106; the BS 110; the packet streams 114, 124; the MS 118; the variable-rate encoder 120; the HARQ logic 122, 134; the decoder 132; the receivers 128, 140; the CINR tracking module 136; the CINR feedback logic 142; the transmitters 144, 160; the code rate logic 148; the map selection logic 152; the maps 156, 156A, 156B, 156C, 156D; the system 180; and the antenna 186 may all be characterized as "modules" herein.

The modules may include hardware circuitry, single or multi-processor circuits, memory circuits, software program modules and objects, firmware, and combinations thereof, as desired by the architect of the apparatus 100 and the system 180 and as appropriate for particular implementations of various embodiments.

The apparatus and systems described herein may be useful in applications other than assigning an MS to a map or to a sub-map in a wireless communication system based upon a packet error count and/or a CINR value associated with packets received at the MS. Thus, various embodiments of the invention are not to be so limited. The illustrations of the apparatus 100 and the system 180 are intended to provide a general understanding of the structure of various embodiments. They are not intended to serve as a complete description of all the elements and features of apparatus and systems that might make use of the structures described herein.

The novel apparatus and systems of various embodiments may be included in electronic circuitry used in high-speed computers, communication and signal processing circuitry, modems, single or multi-processor modules, single or multiple embedded processors, multi-core processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 2A:
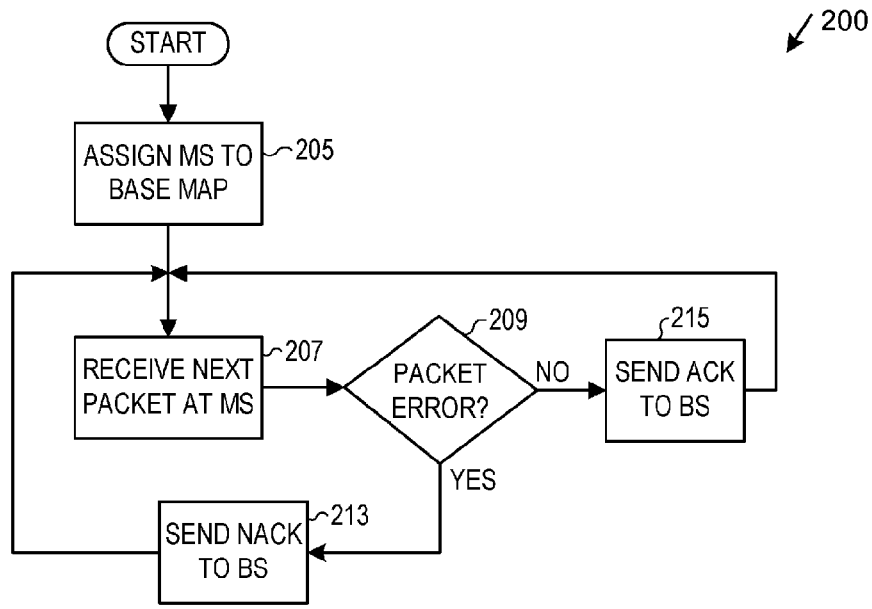
FIG. 2A is a flow diagram illustrating several methods according to various embodiments.
Figure 2B:
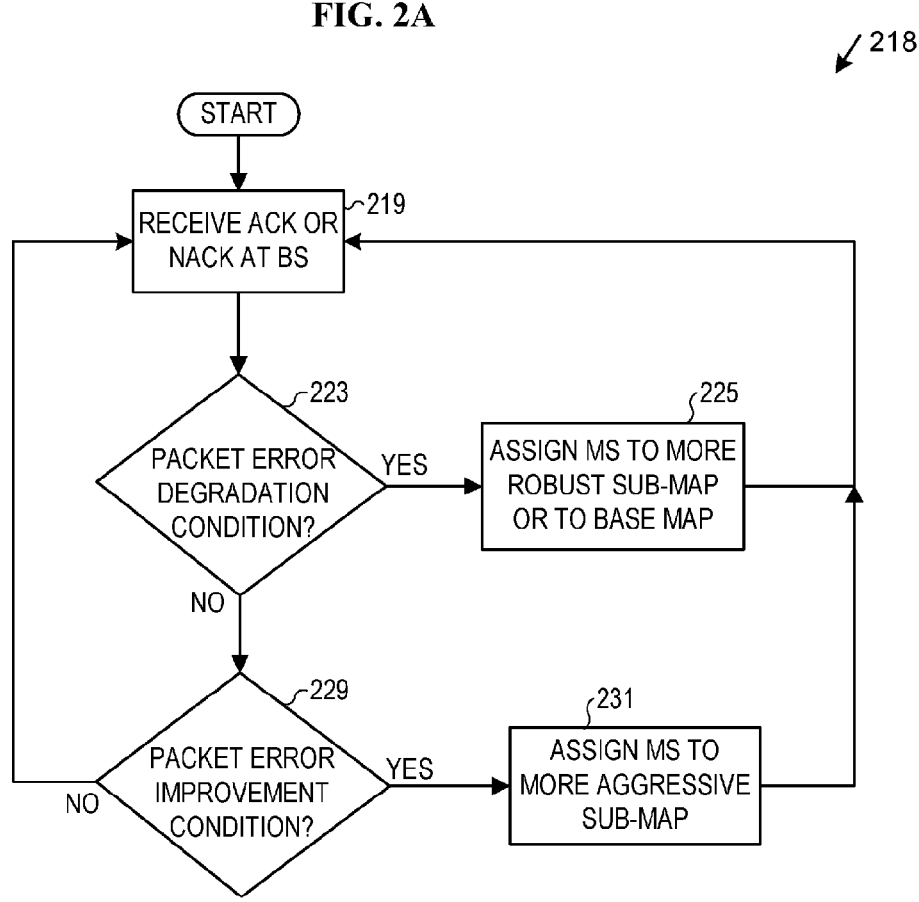
FIG. 2B is a flow diagram illustrating several methods according to various embodiments.
Figure 2C:
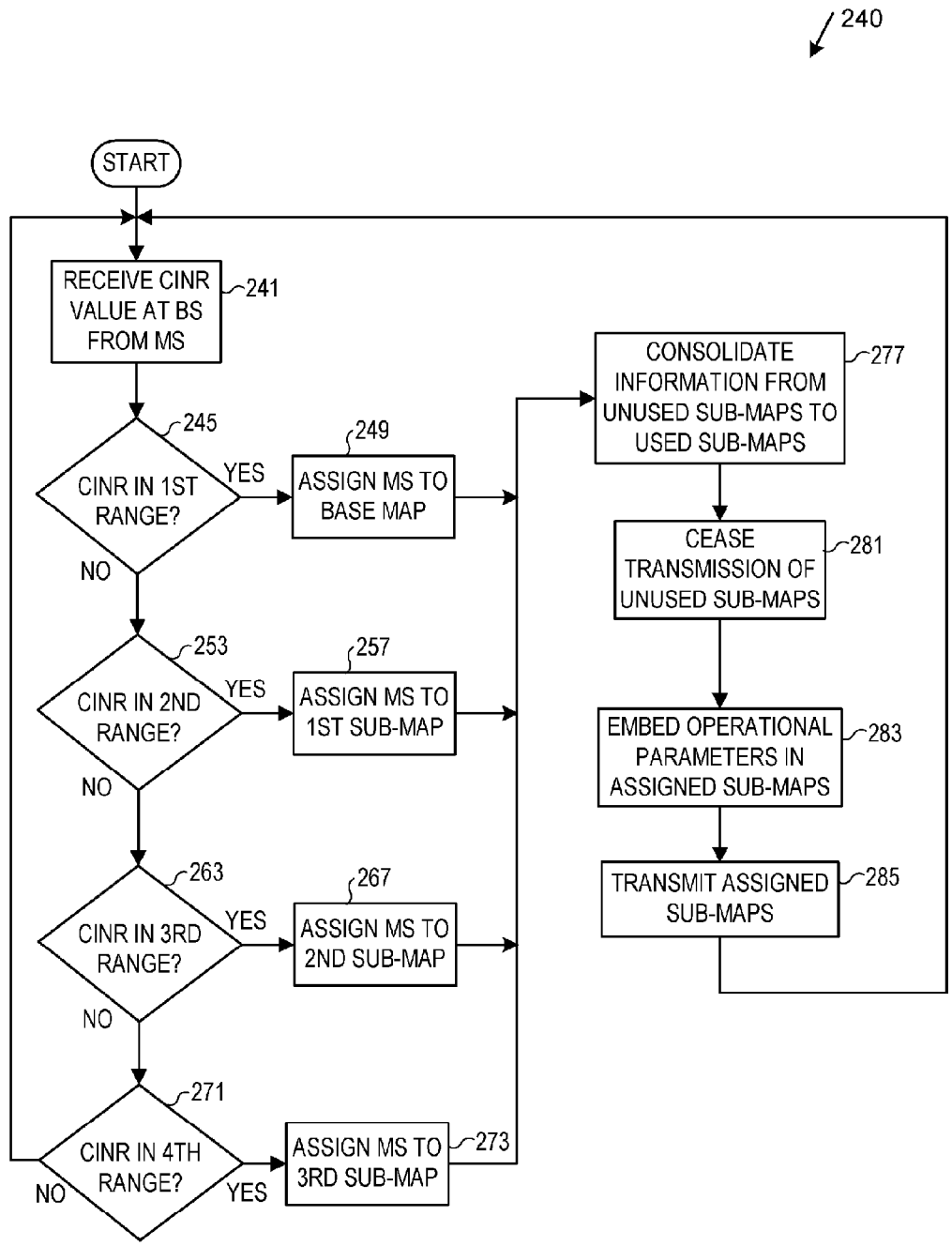
FIG. 2C is a flow diagram illustrating several methods according to various embodiments.

FIGS. 2A, 2B, and 2C are flow diagrams illustrating several methods according to various embodiments. The methods may vary a code rate of a transmitted packet stream in a wireless communication system. The code rate may be varied according to a packet error condition associated with a reception of a packet stream at a receiver. The error condition may be determined by a network entity associated with the wireless communication system, including perhaps at a source of the transmitted packet stream. Turning back to FIG. 1, for example, the code rate may be varied according to a packet error condition associated with a packet stream 114 transmitted by a BS 110 and received at a receiver 140 associated with an MS 118.

The packet error condition may comprise a packet error degradation condition or a packet error improvement condition. The packet error condition may be derived from a count of errored packets. In some embodiments, the packet error condition may be based upon a count of consecutive errored packets. For example, a receipt of two consecutive errored packets may constitute a packet error degradation condition. A receipt of ten consecutive error-free packets may comprise a packet error improvement condition. These are merely examples. Any condition based upon a count of errored packets may comprise the packet error condition.

The packet stream may comprise one or more parametric control messages. Some embodiments may operate in a wireless communication system according to an IEEE 802.16e standard, as previously described. The parametric control messages may comprise a base map, a sub-map of a compressed map, or both, according to the IEEE 802.16e standard. Turning again to the example of FIG. 1, the parametric control message may comprise a base map 156A, a first sub-map 156B, a second sub-map 156C, and/or a third sub-map 156D. For purposes of the example, assume that the base map is encoded at a more robust rate than the coding rates associated with the sub-maps. Assume further that each of the first through third sub-maps is encoded at a higher rate than the previous sub-map. That is, Rate(SM1)<Rate(SM2)<Rate(SM3). Consequently, each of the first through third sub-maps may be less robust than the previous sub-map. That is, Robustness(SM1)>Robustness(SM2)>Robustness(SM3).

The transmitting source of the parametric control messages may be included in a BS according to the IEEE 802.16e standard, and the receiver may be included in an MS according to the IEEE 802.16e standard. The BS may operate with the MS in an ARQ mode, a HARQ mode, or both. The code rate may comprise a modulation coding scheme according to the IEEE 802.16e standard.

Turning to FIG. 2A, a network entity, including the BS in some embodiments, may assign the MS to an available map. A method 200 may commence at block 205 with assigning the MS to the base map. In the example of FIG. 1, the MS 118 may be assigned to the base map 156A. The method 200 may continue at block 207 with receiving a next packet at the MS. The MS may determine whether the next packet was received with errors requiring a retransmission, at block 209. A received packet that cannot be forward error corrected may require a retransmission, for example. The retransmission may be requested by sending a NACK to the BS, at block 213. If no retransmission is required, the MS may send an ACK to the BS, at block 215.

Turning to FIG. 2B, a method 218 may commence at block 219 with receiving the above-describe ACK or NACK. In the case of a received NACK, the BS may determine whether the received NACK satisfies a packet error degradation condition, at block 223. If so, the method 218 may include assigning the MS to a more robust sub-map or to the base map, at block 225. The base map or the more robust sub-map may be encoded at a lower rate than a sub-map to which the MS was immediately previously assigned. In some embodiments, the more robust sub-map may be encoded at a next-lower available rate. The method 218 may then return to block 219 to receive another ACK or NACK.

If the received ACK or NACK does not satisfy the packet error degradation condition, the method 218 may determine whether the received ACK or NACK satisfies a packet error improvement condition, at block 229. If so, the method 218 may assign the MS to a more aggressive sub-map, at block 231. The more aggressive sub-map may be encoded at a higher rate than a sub-map to which the MS was immediately previously assigned. In some embodiments, the more aggressive sub-map may be encoded at a next-higher available rate. If the received ACK or NAK does not satisfy the packet error improvement condition, the method 218 may then return to block 219 to receive another ACK or NACK.

Turning to FIG. 2C, some embodiments may vary the code rate according to a CINR of the packet stream as received at the MS, if a value of the CINR is available at the BS. That is, upon receiving a notification at the BS of a change in a CINR associated with a packet transmission received at the MS from the BS, the BS may re-evaluate an assignment of the MS to a map encoded at a particular rate. A method 240 may receive the CINR value at the BS from the MS, at block 241. The CINR value may be measured at the MS at a time of reception of a map region, a sub-map region, or both. The map and sub-map regions may be associated with a wireless media access control frame. The CINR value may be received at the BS via a dedicated feedback channel, an uplink packet, or both. The dedicated feedback channel may comprise a channel quality information channel according to the IEEE 802.16e standard.

The method 240 may continue at block 245 with determining whether the CINR value is within a first CINR range. If so, the MS may be assigned to the base map, at block 249. If the CINR value is not within the first CINR range, the method 240 may determine whether the CINR value is within a second CINR range, at block 253. Each value of the second CINR range may be higher than each value of the first CINR range but lower than each value of a third CINR range. If the CINR value is within the second CINR range, the MS may be assigned to a first sub-map, at block 257. The first sub-map may be encoded at a higher code rate than the base map.

If the CINR value is not within the second CINR range, the method 240 may determine whether the CINR value is within the third CINR range, at block 263. Each value of the third CINR range may be higher than each value of the second CINR range but lower than each value of a fourth CINR range. If the CINR value is within the third CINR range, the MS may be assigned to a second sub-map, at block 267. The second sub-map may be encoded at a higher code rate than the first sub-map.

If the CINR value is not within the third CINR range, the method 240 may determine whether the CINR value is within the fourth CINR range, at block 271. Each value of the fourth CINR range may be higher than each value of the third CINR range. If the CINR value is within the fourth CINR range, the MS may be assigned to a third sub-map, at block 273. The third sub-map may be encoded at a higher rate than the second sub-map. Although the above examples describe four CINR ranges, the methods and apparatus described herein may be implemented with a different number of CINR ranges. In some embodiments, the number of CINR ranges may correspond to a number of code rates available for each parametric control message to be transmitted. The example above describes four CINR ranges corresponding to the four maps that may exist in certain IEEE 802.16e implementations.

The method 240 may continue at block 277 with consolidating information from unused sub-maps. Information from a sub-map to which no MS is assigned may be transferred to one or more sub-maps to which one or more MSs are assigned. The method 240 may also include ceasing transmission of the sub-map to which no MS is assigned, at block 281. The method 240 may further include embedding one or more operational parameters in the sub-map to which the MS is assigned, at block 283. The assigned sub-map may be transmitted from the BS, at block 285.

It may be possible to execute the activities described herein in an order other than the order described. And, various activities described with respect to the methods identified herein may be executed in repetitive, serial, and/or parallel fashion.

A software program may be launched from a computer-readable medium (CRM) in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
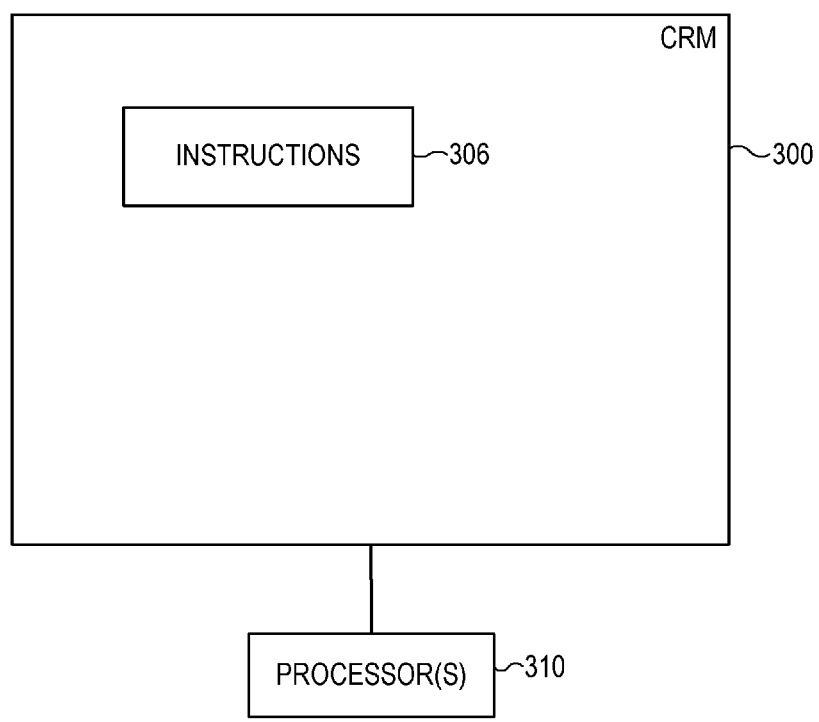
FIG. 3 is a block diagram of a computer-readable medium according to various embodiments.

FIG. 3 is a block diagram of a computer-readable medium (CRM) 300 according to various embodiments of the invention. Examples of such embodiments may comprise a memory system, a magnetic or optical disk, or some other storage device. The CRM 300 may contain instructions 306 which, when accessed, result in one or more processors 310 performing any of the activities previously described, including those discussed with respect to the methods 200 noted above.

Apparatus, systems, and methods herein may assign an MS to a map or a sub-map transmitted from a BS in a wireless communication system. Assignments may be based upon short-term error conditions, long-term error conditions, and/or CINR values associated with packets received at the MS. Bandwidth overhead associated with transmitting unused sub-maps and/or with transmitting sub-maps at an unnecessarily low coding rate may be conserved thereby.

Although the inventive concept may include embodiments described in the exemplary context of an Institute of Electrical and Electronic Engineers (IEEE) standard 802.xx implementation (e.g., 802.11, 802.11a, 802.11b, 802.11e, 802.11g, 802.16, 802.16e™, etc.), the claims are not so limited. Additional information regarding the IEEE 802.11 standard may be found in "ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications" (published 1999; reaffirmed June 2003). Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11e standard may be found in "IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the present invention may be implemented as part of a wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method performed by a base station, the method comprising:
    receiving channel quality information from a mobile station;
    selecting one of a plurality of predetermined sub-maps based on a mapping between the channel quality information and the predetermined sub-maps, wherein the mapping indicates more than one sub-map of the sub-maps is selectable for a given channel quality information; and
    for a downlink transmission, indicating the selected sub-man as an index value to the mobile station in control information, wherein the channel quality information comprises a rate of acknowledgements (ACKs) to negative acknowledgements (NACKs) (ACK/NACK rate) received from the mobile station and a channel quality indicator (CQI) provided by the mobile station, and
    wherein and the selection of the sub-map is based at least in part on the ACK/NACK rate and the CQI.

2. The method of claim 1 wherein the selection of the sub-map is based at least in part on hybrid automatic repeat requests (HARQs) received from the mobile station.

3. The method of claim 1 wherein the selection of the sub-man is further based on an amount of data to send to the mobile station.

4. The method of claim 1 wherein the selected sub-map scheme is indicated as an sub-map index to the mobile station in downlink control information.

5. The method of claim 4 wherein the sub-map index indicated by the downlink control information further indicates a transport block size.

6. A base station arranged to:
receive channel quality information from a mobile station;
select one of a plurality of predetermined sub-maps based on a mapping between the channel quality information and the predetermined modulation and coding schemes, wherein the mapping indicates more than one sub-map of the sub-maps is selectable for a given channel quality information; and
for a downlink transmission, indicate the selected sub-map scheme as an index value to the mobile station in control information, wherein the channel quality information comprises a rate of acknowledgements (ACKs) to negative acknowledgements (NACKs) (ACK/NACK rate) received from the mobile station and a channel quality indicator (CQI) provided by the mobile station, and
wherein and the selection of the sub-map is based at least in part on the ACK/NACK rate and the CQI.

7. The base station of claim 6 wherein the selection of the M sub-man CS is based at least in part on hybrid automatic repeat requests (HARQs) received from the mobile station.

8. The base station of claim 6 wherein the selection of the sub-map is further based on an amount of data to send to the mobile station.

9. The base station of claim 6 wherein the selected sub-map scheme is indicated as an sub-map index to the mobile station in downlink control information.

10. The base station of claim 9 wherein the sub-map index indicated by the downlink control information further indicates a transport block size.

11. A method performed by a mobile station comprising:
providing channel quality information to a base station;
receiving downlink control information for a downlink shared channel, the downlink control information being configured by the base station based at least in part on the channel quality information;
reading a sub-man field of the control information to determine a sub-map index;
determining a modulation order from a table based on the sub-map index, wherein at least some different sub-map indexes map to a same modulation order;
decoding the shared channel based on the selected modulation order;
determining a transport block size index for the shared channel from the table based on the sub-map index; and
determining a transport block size from a second table based on the transport block size index and a number of allocated resource blocks wherein at least some different sub-map indexes map to a same modulation order for different transport block sizes.

12. The method of claim 11 further comprising receiving a resource allocation indicating the number of allocated resource blocks.

13. The method of claim 12 wherein the channel quality information used by the base station comprises a channel quality indicator (CQI), acknowledgements (ACKs) and negative acknowledgements (NACKs).

14. The method of claim 13 wherein the channel quality information used by the base station further comprise hybrid automatic repeat requests (HARQs).

15. A mobile station comprising a physical layer arranged to:
provide channel quality information to a base station;
receive downlink control information for a downlink shared channel, the downlink control information being configured by the base station based at least in part on the channel quality information;
read a sub-map field of the control information to determine a sub-map index;
determine a modulation order from a table based on the sub-map index, wherein at least some different sub-map indexes map to a same modulation order;
decode the shared channel based on the selected modulation order;
determining a transport block size index for the shared channel from the table based on the sub-map index; and
determining a transport block size from a second table based on the transport block size index and a number of allocated resource blocks wherein at least some different sub-map indexes map to a same modulation order for different transport block sizes.

16. The mobile station of claim 15 further comprising receiving a resource allocation indicating the number of allocated resource blocks.

17. The mobile station of claim 16 wherein the channel quality information used by the base station comprises a channel quality indicator (CQI), acknowledgements (ACKs) and negative acknowledgements (NACKs).

18. The mobile station of claim 17 wherein the channel quality information used by the base station further comprise hybrid automatic repeat requests (HARQs).

19. The method of claim 1, wherein the sub-map comprises a modulation and coding scheme.

20. The method of claim 6, wherein the sub-map comprises a modulation and coding scheme.

21. The method of claim 11, wherein the sub-map comprises a modulation and coding scheme.

22. The method of claim 15, wherein the sub-map comprises a modulation and coding scheme.

* * * * *